US008323036B2

(12) United States Patent
Workman

(10) Patent No.: US 8,323,036 B2
(45) Date of Patent: Dec. 4, 2012

(54) WIRING HARNESS FOR TOWING A VEHICLE

(75) Inventor: Michael Workman, Vancouver, WA (US)

(73) Assignee: Tow Daddy, Inc., Vancouver, WA (US)

( * ) Notice: Subject to any disclaimer, the term of this patent is extended or adjusted under 35 U.S.C. 154(b) by 37 days.

(21) Appl. No.: 13/093,214

(22) Filed: Apr. 25, 2011

(65) Prior Publication Data
US 2011/0287637 A1 Nov. 24, 2011

Related U.S. Application Data

(60) Provisional application No. 61/327,219, filed on Apr. 23, 2010.

(51) Int. Cl.
*H01R 33/945* (2006.01)
(52) U.S. Cl. .......................................................... 439/35
(58) Field of Classification Search .................... 439/35, 439/34
See application file for complete search history.

(56) References Cited

U.S. PATENT DOCUMENTS

| 4,842,524 | A | * | 6/1989 | Hopkins et al. | 439/35 |
| 5,800,188 | A | * | 9/1998 | Barber et al. | 439/142 |
| 6,814,581 | B2 | * | 11/2004 | Matsuo et al. | 439/35 |
| 8,031,061 | B2 | * | 10/2011 | Kalous | 340/431 |
| 2008/0037246 | A1 | * | 2/2008 | Schuettenberg | 362/219 |

* cited by examiner

*Primary Examiner* — Gary F. Paumen
(74) *Attorney, Agent, or Firm* — Marger Johnson & McCollom PC

(57) ABSTRACT

A wiring substrate connects an electrical system of a towed vehicle to an electrical system of a towing vehicle and includes a wiring connector configured to connect to a connector from a wiring harness of the towed vehicle, a first set of connections to connect to tail light assemblies in the towed vehicles, a second set of connections to connect to vehicle signal connections in the towed vehicle, the first and second sets of connections electrically coupled on the wiring substrate by at least one diode, and a third set of connections to connect to the towing vehicle. A towing connector connects an electrical system of a towed vehicle to an electrical system of a towing vehicle and includes a first connector configured to provide connection to a native vehicle wiring harness of the towed vehicle, a second connector arranged to provide connection to wires of the towing vehicle, a wiring substrate having conductive traces connecting selected wires from the first connector to the second connector, and diodes residing on the wiring substrate in an electrical path form by the conductive traces.

14 Claims, 8 Drawing Sheets

WIRING HARNESS FOR TOWING A VEHICLE

RELATED APPLICATIONS

This application is a continuation of and claims priority to U.S. Provisional Patent Application No. 61/327,219, filed Apr. 23, 2010.

BACKGROUND

Towing a vehicle with another vehicle occurs frequently. People owning recreation vehicles (RV), for example, often park their RV at an RV park or campground and connect it to any available sources of power and water. If they then want to drive out and explore the region, or run errands, they would have to disconnect their RV and drive it in and out of the campground or park. Typically, the RV owners bring a second vehicle to allow them to come and go without repeatedly disconnecting and reconnecting the RV.

However, towing a vehicle that has its own electrical and signaling system has complications that do not exist when towing something like a trailer. Trailers generally have lights and electrical connections to allow those lights to be selectively powered, such as turn signals and brake lights. Trailers do not provide any power to those lights. The lights are 'passive' in that they receive power and control signals from the towing vehicle. Towing a vehicle that has its own electrical system with a source of power and control for the lights becomes far more complicated. Some sort of override or bypass to the towed vehicle's control system is generally needed, while still allowing the towing vehicle to send signals and power to the lights on the towed vehicle.

Several options exist on the market to allow connection of the towed vehicle's electrical system to the towing vehicles electrical system. One of the simpler solutions involves completely bypassing the vehicle's electrical system and using magnetic tow lights. Magnetic tow lights are quick and easy to connect, do not have any interaction with the towed vehicle's system and fits all towed vehicles. However, they are not as secure as one might hope and can present visibility issues on larger vehicles, as they are generally mounted on the top of the vehicle.

Another solution employs a tail light wiring kit. These kits generally include a redundant set of sockets and plugs that mount inside the towed vehicles. While these kits are more secure than the magnetic kits and use the vehicle's own lights, they require enough room in the tail lights for the redundant parts. Some vehicles do not have enough room to allow the installation of the redundant parts.

Another option uses a set of diodes to connect to the towed vehicle's turn signals, running lights and brake signals to that of the towing vehicle. The diodes operate to protect the vehicles' electrical systems. These kits come with large manuals to show how to install them and generally require more advanced knowledge of electrical systems and electronics to allow installation, as well as concerns about damage if installed incorrectly. A risk also exists that the necessary modifications will void any warranties on the vehicle's system.

Yet another solution involves a bulb and socket approach, where the user replaces the sockets inside the lighting assemblies with a different bulb and socket. However, the amount of perceived illumination from a light is closely regulated by the National Highway Traffic Safety Administration. In order to replace the socket, the user typically has to drill an extra hole into the reflector behind the bulbs. This decreases the amount of perceived illumination and may fall below the required standards. Further, the extra hole will allow in moisture that can cause the light to fail completely, or at least to cloud the outer surface, thereby further reducing the perceived illumination.

With the popularity of RVs and the increasing complexity of the electrical systems in cars, having the ability to 'plug and play' the wiring harness for towing a vehicle would have several benefits. These include ease of use, ease of installation, and alleviating worries about damage to the electrical system.

DETAILED DESCRIPTION OF THE EMBODIMENTS

Currently systems for towing electrical vehicles generally involve systems that are easy to use but not very robust, have a need for extra room in the towed vehicle's lights or involve cutting into the towed vehicle's electrical system, potentially voiding the vehicle warranty. An example of a currently available towing system is shown in FIG. 1.

Figure 1:
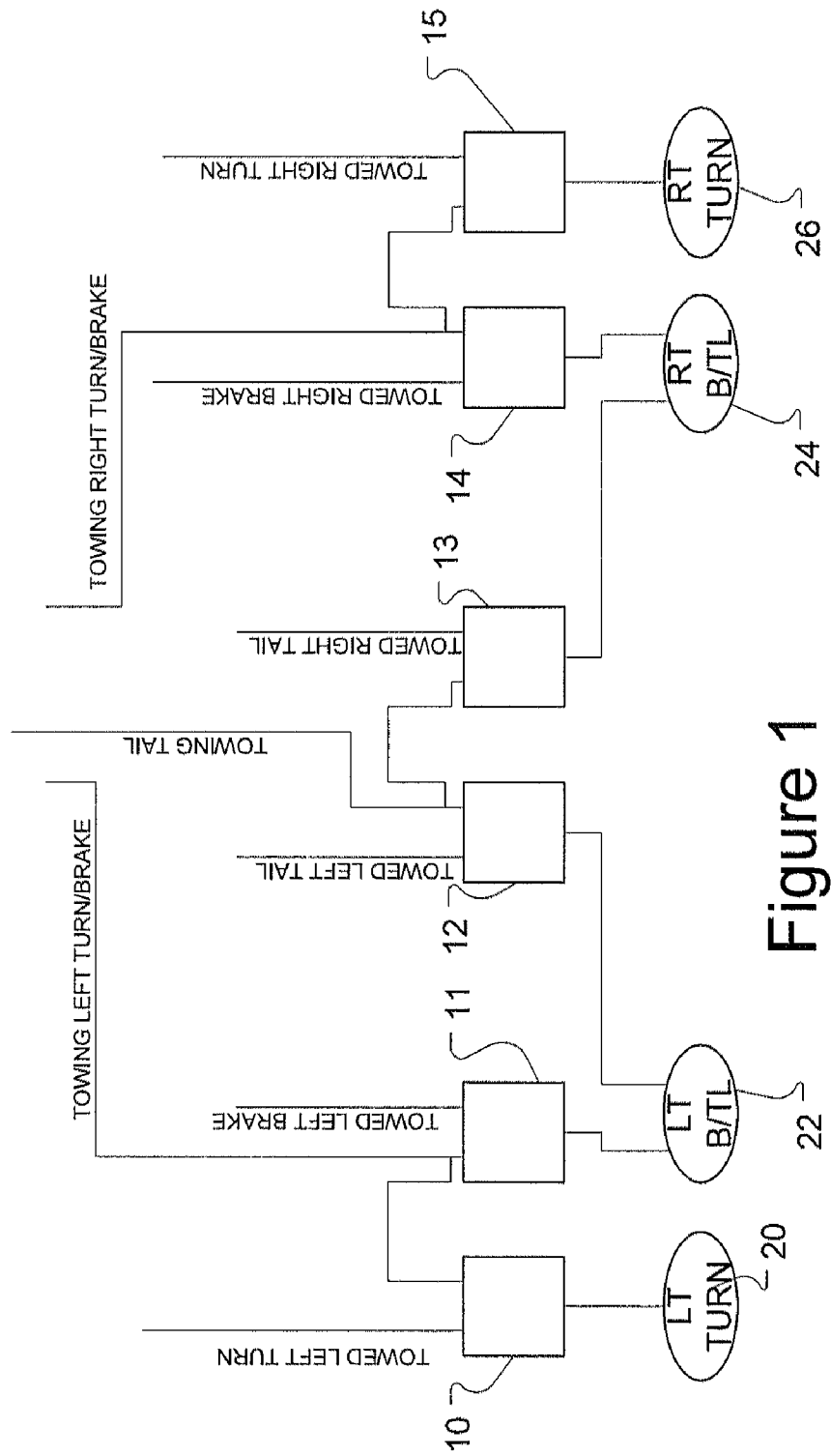
FIG. 1 shows a prior art embodiment of a wiring harness for towing vehicles.

The system of FIG. 1 is for what is referred to as a 'combined' brake and turn arrangement. A combined brake and turn vehicle uses the same lights for brake lights and turn signals. Essentially, the brake lights perform the flashing for the turn signals. A 'separate' brake and turn system has a separate light, generally amber or yellow, that flashes for turn signals. The towed vehicle, which may be referred to here as the 'car,' may have either a separate or combined brake and turn arrangement. The towing vehicle, which may be referred to here as the RV with no limitation to that particular towing vehicle, may also have a combined or separate brake and turn arrangement. This gives rise to four different combinations of towing and towed vehicles: combined/combined; combined/separate; separate/combined; and separate/separate.

The arrangement of FIG. 1 is for a combined/separate arrangement. The towing vehicle such as an RV has a combined brake and turn system in which the brake lights flash for the turn signals. The towed vehicle, such as a car, has a separate brake and turn signal, in which the turn signal light is separate from the brake/tail light. The incoming lines from the towing vehicle are the left turn/brake, tail light/and right turn/brake. The lines from the towed vehicle's native or factory system are the towed left turn, towed brake, towed tail, towed right brake and towed right turn.

As can be seen in FIG. 1, the towed left turn signal and the towing left turn/brake signal come into the diode 10. The towing left turn/brake signal is received through a jumper from the diode 11. The output of diode 10 is sent to the left turn signal 20. In addition to the towing left turn/brake signal input, diode 11 also receives the towed left brake signal. The output of diode 11 is sent to the left brake/tail light 22. It should be noted that in either a separate or a combined brake and turn system, the tail light and the brake light are generally the same light, but may receive two different signals.

The diode 12 receives the towed left tail light signal and the towing tail light signal. The towing tail light signal also provides an input to diode 13 via a jumper. Diode 13 also receives as its input the towed right tail light. Diode 12 sends its output to the left brake and tail light 22, and diode 13 sends its output to the right brake and turn light 24. The right brake and turn light also receives an input from the output of diode 14. Diode 14 receives the towed right brake light as an input and the towing combined turn/brake signal. The combined turn/brake signal also goes to the diode 15 via a jumper. The diode 15 receives as its other input the towed right turn signal and provides its output to the right turn light 26.

As mentioned before, this type of system requires cutting into the wires of the car's native electrical system. This may void the vehicle manufacturer's warranty, as well as cause inadvertent damage to the car's electrical system. Most users do not have the necessary skills to implement these systems and generally take their vehicles to an installer to have these systems installed.

Another drawback is that each variation of combined and separate systems requires a different wiring diagram, increasing the complexity. The wiring diagrams for the other combinations would be very similar to the one in FIG. 1. If the towing vehicle has a separate system, an input line for the brake signal would be included. If the towed vehicle has a combined system, the towed brake signals would not be included.

In addition to the allowing users to install their own towing wiring systems, providing a wiring system that connects upstream of the wires that run to the various rear lights on the towed vehicle avoids the invasion of the car's native electrical system. An embodiment of such a wiring system is shown in FIG. 2.

Figure 2:
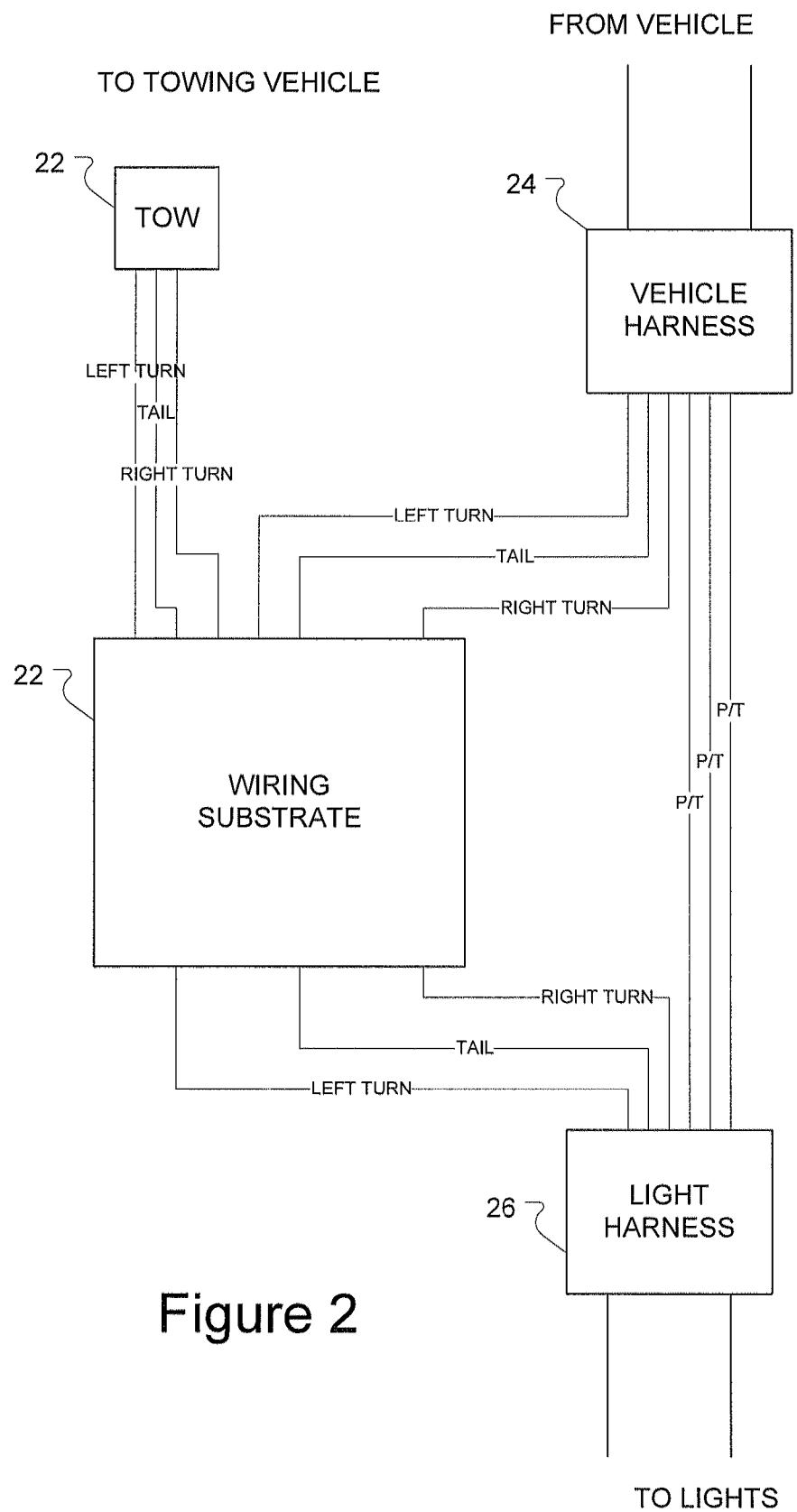
FIG. 2 shows a block diagram of an embodiment of a wiring substrate for towing vehicles.
Figure 3:
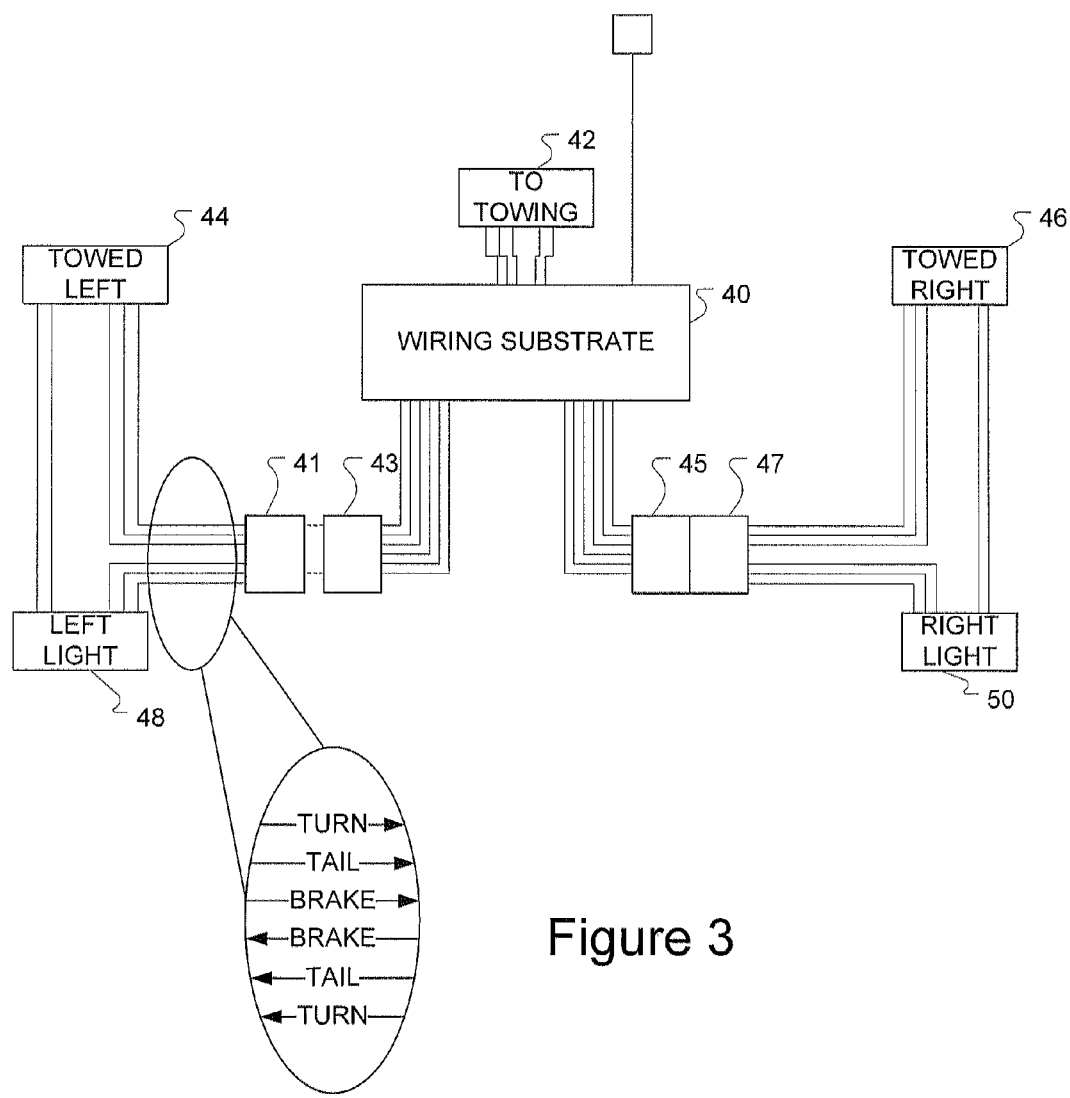
FIG. 3 shows a block diagram of an embodiment of a wiring substrate for towing vehicles.

FIG. 2 shows an embodiment of a combined/combined wiring system that connects into the native wiring connectors in the wiring harness of the vehicle. FIG. 2 shows the overall block diagram of this embodiment and FIG. 3 shows a more specific embodiment of the wiring substrate such as 22. The wiring substrate may be housed in a box and may be referred to as a controller.

In FIG. 2, the native or factory vehicle wiring harness generally has several connectors that allow isolation and repair of different electrical functions on candidate vehicles to be towed. In this embodiment, the connector for the lights, referred to here as the light harness 26, would be disconnected from the native vehicle wiring harness 24. In between the vehicle wiring harness and the light harness, two new connectors would be connected. A first connector would connect selected lines from the native vehicle harness to a wiring substrate 22. A second connector would connect output lines from the wiring substrate 22 to the light harness of the vehicle. Lines not selected for routing to the wiring harness would be passed through (P/T) to the second connector. The wiring substrate would also have a connector 22 to the towing vehicle for receiving signals from the towing vehicle. The wiring substrate would control the output of its lines to the light harness to allow the desired light signal to be sent to the light harness.

FIG. 3 shows a more detailed embodiment of a wiring substrate such as 22. The wiring substrate may be any type of circuit substrate with traces or lines that provide the connections to and from the diodes and to and from the incoming and outgoing lines. Examples include printed circuit boards, ceramic substrates, flexible circuit substrates, etc. Similarly, the elements referred to here as diodes may include many different types of diodes, such as Schottky or zener diodes, as well as other types of forward-biased switching elements such as transistors, etc. No limitation is intended, nor should any be inferred, from any example given here.

As can be seen here, the embodiment of FIG. 2 would generally require a different wiring substrate for the different combinations of separate and combined towing and towed vehicles. It is possible that one wiring substrate may only be needed for the two variations of separate towing vehicles and the two variations of combined towing vehicles. However, generally, the wiring substrates will have to be replicated for the different situations. When one considers that the connectors may differ from manufacturer to manufacturer not to mention vehicle model to vehicle model, the combinations of wiring substrates and connectors may become more numerous than is practical to manufacture.

Figure 4:
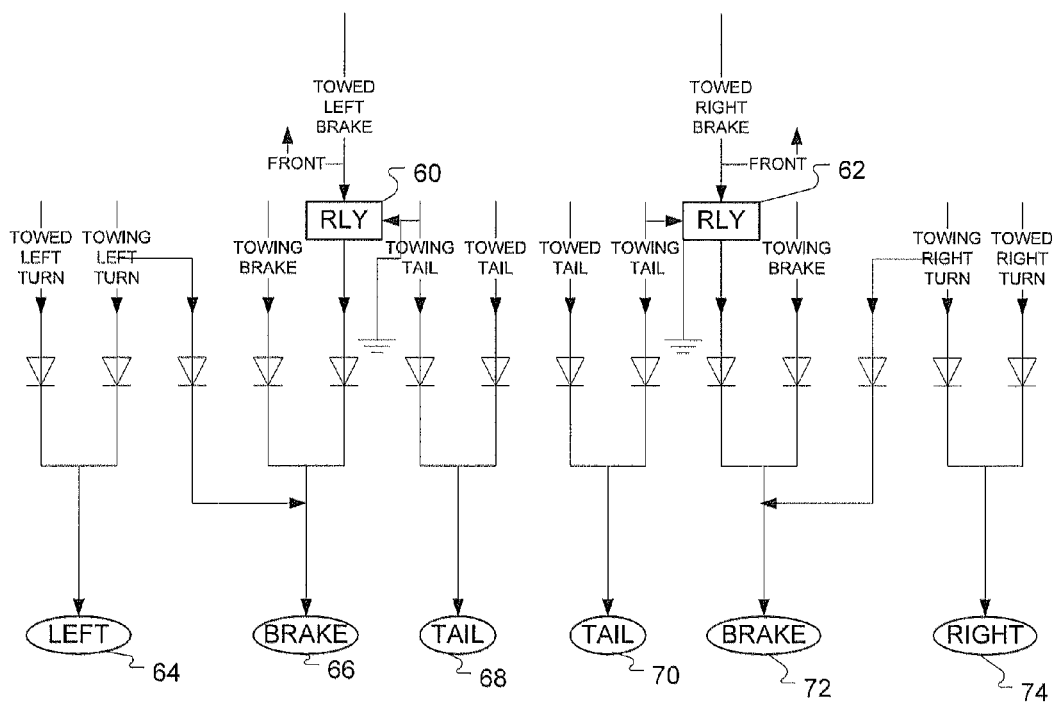
FIG. 4 shows a schematic of an embodiment of a wiring substrate for towing vehicles.

However, it is possible that one wiring substrate may be usable with any combination of separate and combined towed and towing vehicles. This allows the only variation to be the various connectors to be used for different manufacturers and models of vehicles. FIG. 4 shows a block diagram of an embodiment of such a connector and wiring substrate architecture.

In FIG. 3, the wiring substrate is intended to be inserted into the electrical path after the native or factory wiring has split off between the left and right light connectors 44 and 46. The wiring substrate 44 would typically be connected at one of the left or right side of the vehicle, with a longer cable running to the other side of the vehicle for the lights on that side. The wiring substrate would lie in the path between the native or factory left and right connectors 44 and 46 and the connectors to the lights 48 and 50.

The wiring substrate has a connector 42 that connects to the towing vehicle and connectors 43 and 45 that connect to the native or factory left and right connectors 41 and 47.

Without the presence of the wiring substrate and the connectors 43 and 45, the connectors 41 and 47 would otherwise connect to the right and left connectors from the wiring harness, 44 and 46, respectively. As shown the connectors 45 and 47 are shown in the connected position and the connectors 41 and 43 are shown in the disconnected position.

An exploded view of the lines and the signal path direction between the towed harness and the light connector is shown on the left side of the diagram. As can be seen there, the incoming signals from the native left and right harnesses 44 and 46 are sent to the wiring substrate 40 and the returning signals are sent to the car light connectors 48 and 50. The wiring substrate controls the nature of the outgoing signals, based upon incoming signals from the towing vehicle through the towing connector 42. FIG. 4 shows a more detailed diagram of a wiring substrate such as 40.

As can be seen in FIG. 4, the wiring substrate provides for the existence of separate or combined brake and turn signals. If those signals are not present in the native vehicle connector, those signal lines will remain inactive. Similarly, the separation of the left and right turn lights from the left and right brake lights may be overcome by sending the outputs to light 66 instead of separating the outputs to go to 64 and 66. The tail lights 68 and 70, while shown here as separate lights, may physically be the same lights as the brake lights already. Similarly, the outputs of the diodes shown going to both the brake light 72 and the turn light 74 may be sent to the same light as well. Further, two relays 60 and 62 would be used to ensure that the towed vehicle could not override the signals from the towing vehicle while under tow.

Figure 5:
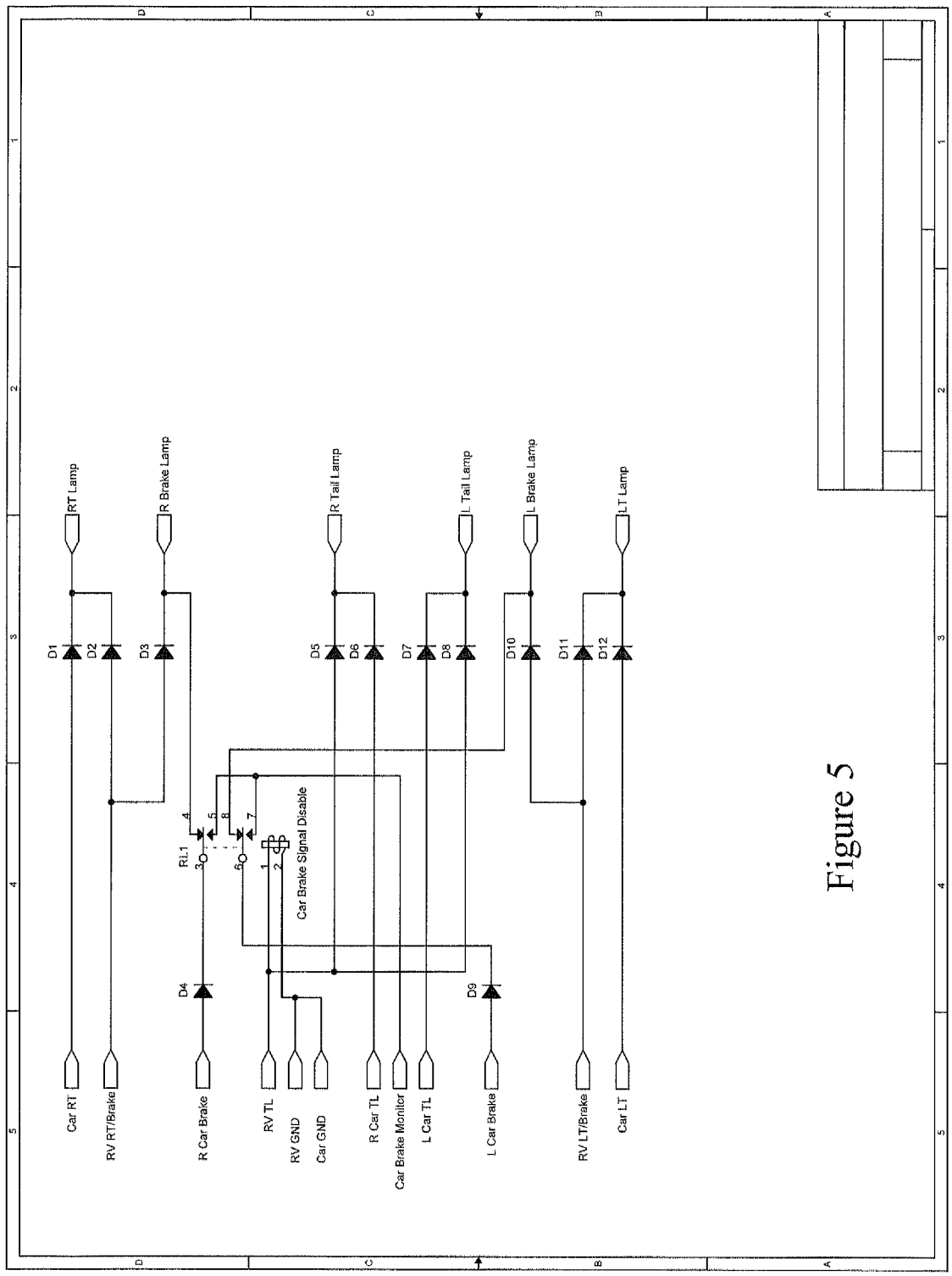
FIG. 5 shows a schematic of a circuit usable in the wiring substrate.

FIG. 5 shows an embodiment of a circuit that is usable in the wiring substrate. The signals in the car and the towing vehicle wires reside at the left side of the diagram and the output signals to the lamps in the lights reside on the right side of the diagram. The diagram designates the towing vehicle as RV. One should note that the diodes D4 and D9 reside behind the relay RL1 to allow isolation from the car brake monitor.

The car brake monitor is shown at RL1, with features 1-8. The RV tail light (RV TL) must be energized to disable the car brake signal. Generally, the RV GND signal will be the white wire in the 4 wire cable, and the Car GND will be terminated in some manner attached to the car body.

Figure 6:
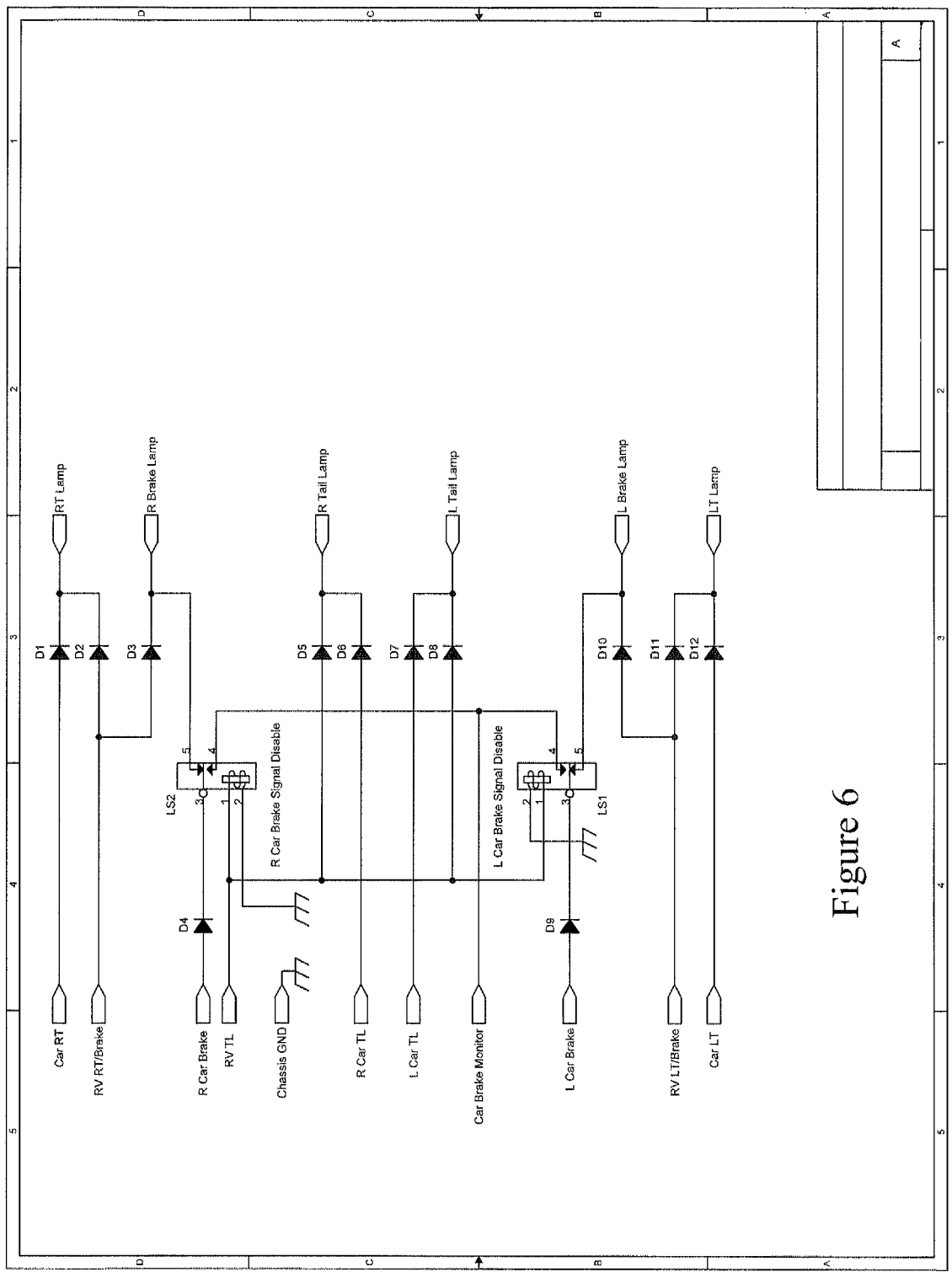
FIG. 6 shows a schematic of another embodiment of a circuit usable in the wiring substrate.

FIG. 6 shows an alternative embodiment for a circuit usable in the wiring substrate. As in the previous embodiment, this embodiment has the diodes D4 and D9 residing behind the relays LS1 and LS2. In this embodiment the car brake signals have separate relays for disabling of the Car Brake signal when the RV tail light (RV TL) signal is active.

One should note that these are equivalent circuits and they are merely examples of possible circuit configurations, the selection of which is left to the system designer. Any of these variations are considered to be within the scope of the embodiments.

Figure 7:
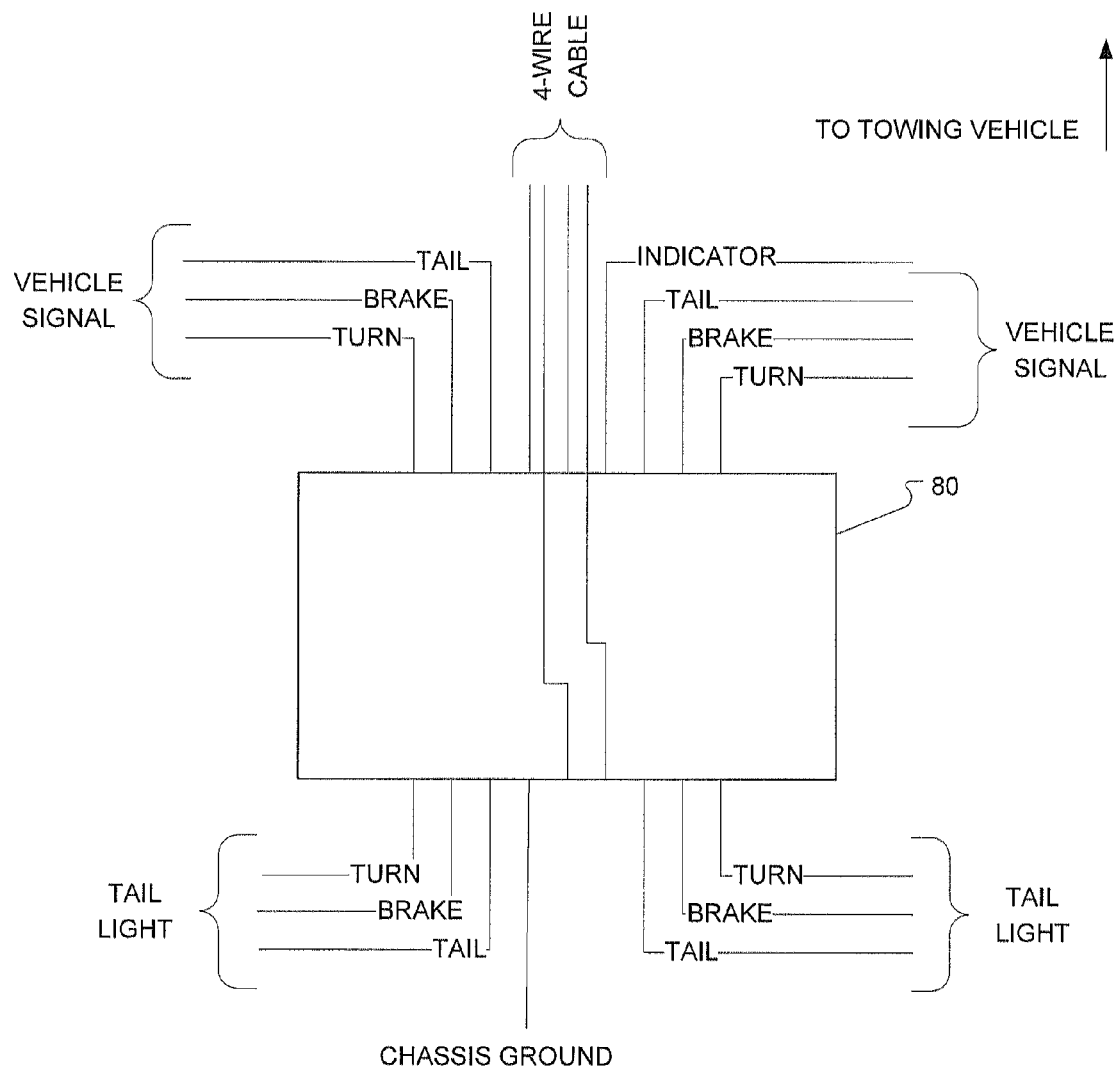
FIGS. 7 and 8 show an alternative embodiment of a wiring substrate.
Figure 8:
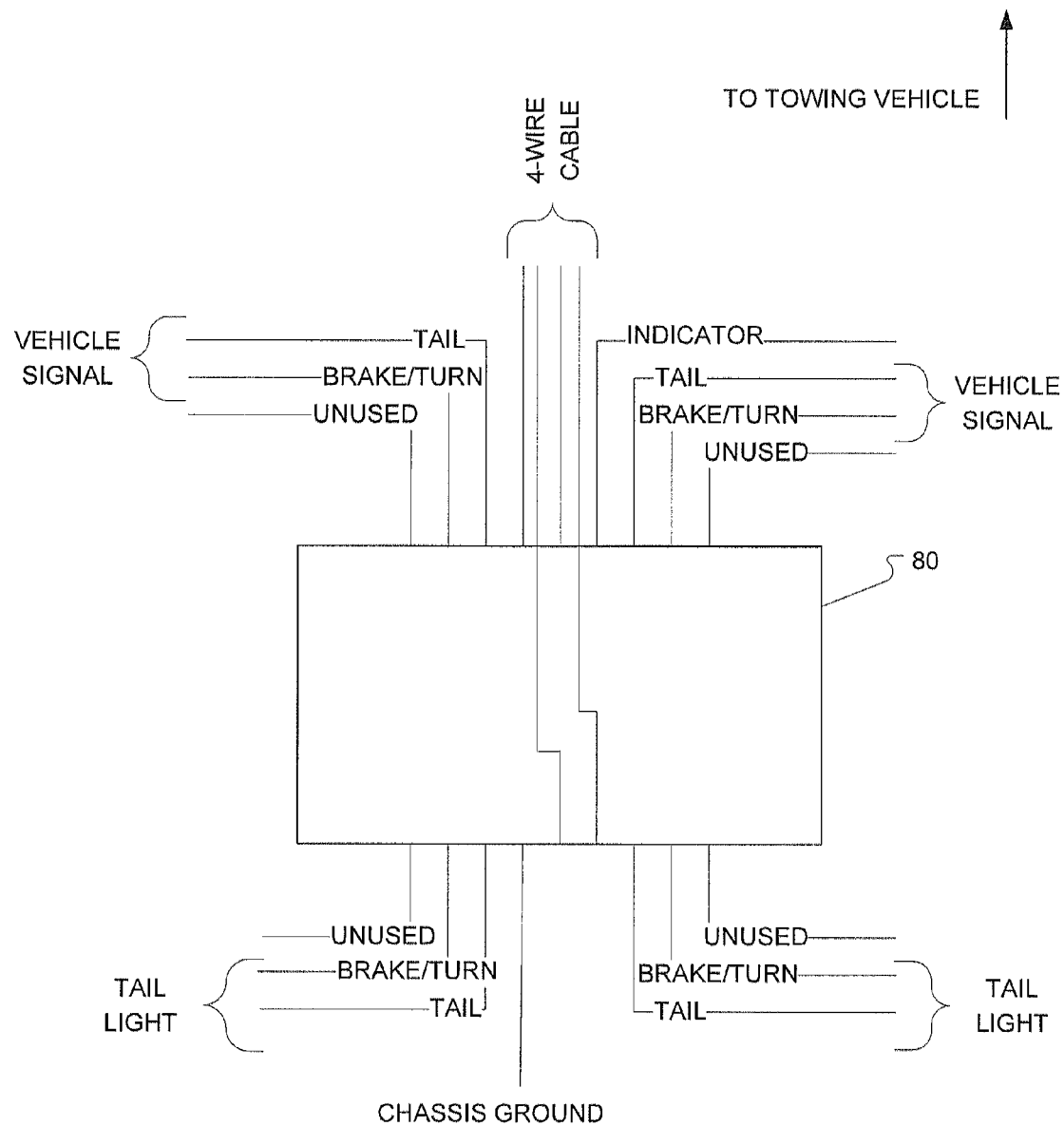

As mentioned previously, one advantage of using connectors to connect to the existing wiring harness connectors lies in the avoidance of cutting into the vehicle wiring. However, for cost as well as other reasons, such as the unavailability of a connector for some vehicles perhaps, the wiring substrate can be used in a more simplified embodiment that does involve cutting into the vehicle's wiring. FIGS. 7 and 8 show embodiments of a wiring substrate 82 where connections are obtained by cutting into the vehicle's wiring.

FIG. 7 shows an embodiment of a wiring substrate 80 for a separate brake and turn configuration. As mentioned above, some vehicles have a separate light for braking and turn signals, others have a combined brake and turn light. In FIG. 7, the wiring substrate 80 has 5 sets of connections. The first set of connections is for the left tail light of the towed vehicle. The user would cut into the wires running to the tail light assembly of the car and would attach the TURN, BRAKE and TAIL light wires to the 18-pin connector 82 on the wiring substrate 80. This would then be repeated on the other side tail light. For clarity in the drawing, the connections are just shown to the edge of the wiring substrate 80, with the understanding that they would connect to the 18-pin connector.

Generally, the approach involves taking the towing vehicle signal and the towed vehicle signal and using diodes to connect them to the respective towed vehicle lamp or light. For purposes of these drawings, the towed vehicle is designated CAR and the towing vehicle is indicated as RV, as to do otherwise makes the schematic much more confusing. Because this configuration is one embodiment of a separate brake and turn, there are six resulting lamp signals, TURN, TAIL and BRAKE for each of the right and left sides.

A wire may be available from the wiring substrate 80. The INDICATOR wire may be included to allow mounting of a towed vehicle brake indicator for the towing vehicle dash board. This would allow the operator of the towing vehicle to know if the brake lights on the towed vehicle were operating properly without having to exit the towing vehicle and then walk around the towed vehicle while some one else engaged the brakes to ensure that the lights were operating correctly. A chassis ground wire also connects to the wiring substrate 80. This allows the wiring substrate to operate correctly.

In FIG. 8, similar sets of connections exist, except that the separate TURN signal wires on all four sets are UNUSED, as the wires for the separate TURN signal wires are not needed for a combined brake and turn configuration. The wiring substrate or controller box remains the same, but the TURN wires are not used. In FIG. 8, the diodes D3-D10 would reside on the wiring substrate and connected to traces from the 18-pin connector 80. The diodes from FIG. 7 that are used for the separate turn connectors are not used.

One must note that this embodiment has one wiring substrate 80 that provides connections for both sides of the car. However, in another embodiment, each side of the vehicle could have its own substrate. Essentially the connector/wiring substrate 80 would be divided into two parts, each within its own box. Further, the particular layout and wiring configurations are merely for purposes of discussion and not intended to limit the scope of the claims in any way.

In addition to the connections shown, an INDICATOR wire may be included to allow mounting of a towed vehicle brake indicator for the towing vehicle dash board. This would allow the operator of the towing vehicle to know if the brake lights on the towed vehicle were operating properly without having to exit the towing vehicle and then walk around the towed vehicle while some one else engaged the brakes to ensure that the lights were operating correctly.

A chassis ground wire also connects to the wiring substrate 80. This allows the wiring substrate to operate correctly.

In FIG. 8, similar sets of connections exist, except that the separate TURN signal wires on all four sets are UNUSED, as the wires for the separate TURN signal wires are not needed for a combined brake and turn configuration. The wiring substrate or controller box remains the same, but the TURN wires are not used.

In this manner, one wiring substrate may be used for any combination of separate or combined brake and turn for the towed and towing vehicles. This arrangement has the added advantage that one wiring substrate may be connected to any type of connector needed for any combination of towed and towing vehicles. This approach has the advantage that the vehicle-specific wiring and the towing wiring may be separated. The same wiring substrate would be used with any vehicle, with a separate, vehicle specific adapter connecting to it. This allows the wiring substrate to be universal across all vehicles and reduces the costs to the consumer upon purchasing of a second vehicle. The user would only have to buy the vehicle specific adapter, not the wiring substrate since he or she would already have it.

In addition, the embodiments disclosed here make installation of wiring harness for towing vehicles much simpler than current approaches, essentially being 'plug and play.' In addition, some embodiments avoid any issues with voiding warranties on the towed vehicle's electrical system.

It will be appreciated that several of the above-disclosed and other features and functions, or alternatives thereof, may be desirably combined into many other different systems or applications. Also that various presently unforeseen or unanticipated alternatives, modifications, variations, or improvements therein may be subsequently made by those skilled in the art are also intended to be encompassed by the above description.

What is claimed is:

1. A wiring substrate to connect an electrical system of a towed vehicle to an electrical system of a towing vehicle comprising:
    a wiring connector configured to connect to a connector from a wiring harness of the towed vehicle;

a first set of connections to connect to tail light assemblies in the towed vehicles;

a second set of connections to connect to vehicle signal connections in the towed vehicle, the first and second sets of connections electrically coupled on the wiring substrate by at least one diode: and a third set of connections to connect to the towing vehicle.

2. The wiring substrate of claim 1, wherein the first set of connections comprises two sets of connections, one for each tail light assembly.

3. The wiring substrate of claim 1, wherein the first set of connections comprises connections for a combined brake and turn signal.

4. The wiring substrate of claim 1, wherein the first set of connections comprises connections for a separate brake and turn signal.

5. The wiring substrate of claim 1, wherein the wiring substrate includes a connection for a brake light indicator to be mounted in the towing vehicle.

6. The wiring substrate of claim 1, wherein the third set of connections comprises a 4-wire towing connector.

7. The wiring substrate of claim 1, wherein the wiring substrate is enclosed in a housing.

8. The wiring substrate of claim 1, wherein the housing includes lights electrically connected to the connections such that the lights are powered when the connections are complete.

9. A towing connector to connect an electrical system of a towed vehicle to an electrical system of a towing vehicle, comprising:

a first connector configured to provide connection to a native vehicle wiring harness of the towed vehicle;

a second connector arranged to provide connection to wires of the towing vehicle;

a wiring substrate having conductive traces connecting selected wires from the first connector to the second connector; and diodes residing on the wiring substrate in an electrical path form by the conductive traces.

10. The towing connector of claim 9, wherein the second connector comprises a vehicle-specific connector.

11. The towing connector of claim 9, wherein the wiring substrate includes an indicator connection electrically coupled to an indicator light such that the light is powered when the first and second connectors complete a connection.

12. The towing connector of claim 9, wherein the first connector provides connections for combined brake and turn lights on the towed vehicle.

13. The towing connector of claim 9, wherein the first connector provides connections for separate brake and turn light son the towed vehicle.

14. The towing connector of claim 9, wherein the first and second connectors, the wiring substrate and the diodes only include wires, traces and diodes for one side of the towed vehicle, and the towing connector further comprises another set of connectors, wiring substrate and diodes for another side of the towed vehicle.

* * * * *